United States Patent
Ansari et al.

(10) Patent No.: US 12,449,364 B2
(45) Date of Patent: Oct. 21, 2025

(54) METHOD AND DEVICE FOR OPTICALLY EXAMINING A BIOLOGICAL SAMPLE

(71) Applicant: Leica Microsystems CMS GmbH, Wetzlar (DE)

(72) Inventors: Nariman Ansari, Offenbach am Main (DE); Falk Schlaudraff, Butzbach (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 688 days.

(21) Appl. No.: 17/352,401

(22) Filed: Jun. 21, 2021

(65) Prior Publication Data

US 2021/0404965 A1 Dec. 30, 2021

(30) Foreign Application Priority Data

Jun. 25, 2020 (EP) .................................. 20182204

(51) Int. Cl.
*G01N 21/64* (2006.01)
*G02B 21/00* (2006.01)
*G02B 21/36* (2006.01)

(52) U.S. Cl.
CPC ..... *G01N 21/6486* (2013.01); *G01N 21/6458* (2013.01); *G02B 21/0032* (2013.01); *G02B 21/0076* (2013.01); *G02B 21/367* (2013.01)

(58) Field of Classification Search
CPC ........... G01N 21/6486; G01N 21/6458; G02B 21/0032; G02B 21/0076; G02B 21/367
See application file for complete search history.

(56) References Cited

U.S. PATENT DOCUMENTS

| | | | | |
|---|---|---|---|---|
| 2005/0258376 | A1* | 11/2005 | Takatsuka | G02B 21/16 250/458.1 |
| 2013/0335818 | A1* | 12/2013 | Knebel | G01N 21/6458 359/385 |
| 2014/0340483 | A1* | 11/2014 | Ritter | G02B 27/58 348/46 |
| 2016/0327779 | A1* | 11/2016 | Hillman | G02B 21/0032 |
| 2018/0074305 | A1 | 3/2018 | Atzler et al. | |
| 2019/0056581 | A1 | 2/2019 | Tomer et al. | |
| 2019/0302437 | A1 | 10/2019 | Hillman | |

FOREIGN PATENT DOCUMENTS

DE 102017116380 B3 * 12/2018 ......... G02B 21/0032

OTHER PUBLICATIONS

Translation of DE102017116380B2, Schumann Christian, Dec. 20, 2018 (Year: 2018).*

(Continued)

*Primary Examiner* — Henry H Nguyen
(74) *Attorney, Agent, or Firm* — LEYDIG, VOIT & MAYER, LTD.

(57) ABSTRACT

A method for optically examining a biological sample includes: preparing a light-activatable specimen including the biological sample; activating a target region of the light-activatable specimen by irradiating activation light into the light-activatable specimen, the activation light being formed by a light sheet that illuminates a plane in the light-activatable specimen, the plane including at least a part of the biological sample; and imaging the plane illuminated with the light sheet.

13 Claims, 5 Drawing Sheets

(56) References Cited

OTHER PUBLICATIONS

Karimi et al., "Smart Nanostructures for Cargo Delivery: Uncaging and Activating by Light", J. Am. Chem. Soc. 2017, 139, 4584-4610 (Year: 2017).*

Marcos-Vidal, Asier et al.: "Recent advances in optical tomography in low scattering media", Optics and Lasers in Engineering, Elsevier, Amsterdam, NL, vol. 135, Jun. 15, 2020 (Jun. 15, 2020), XP086345756, pp. 1-15.

* cited by examiner

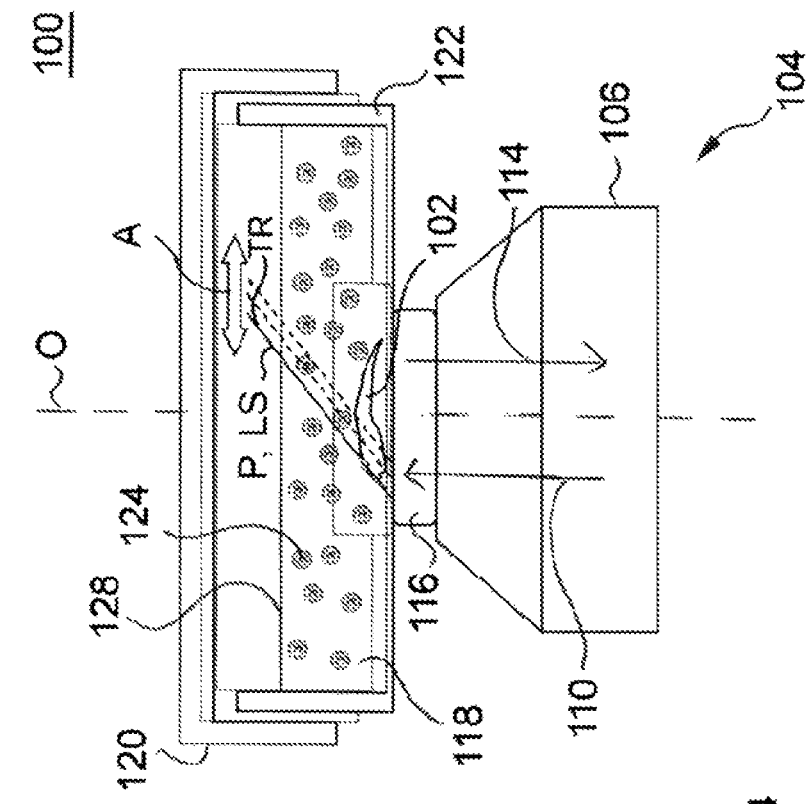
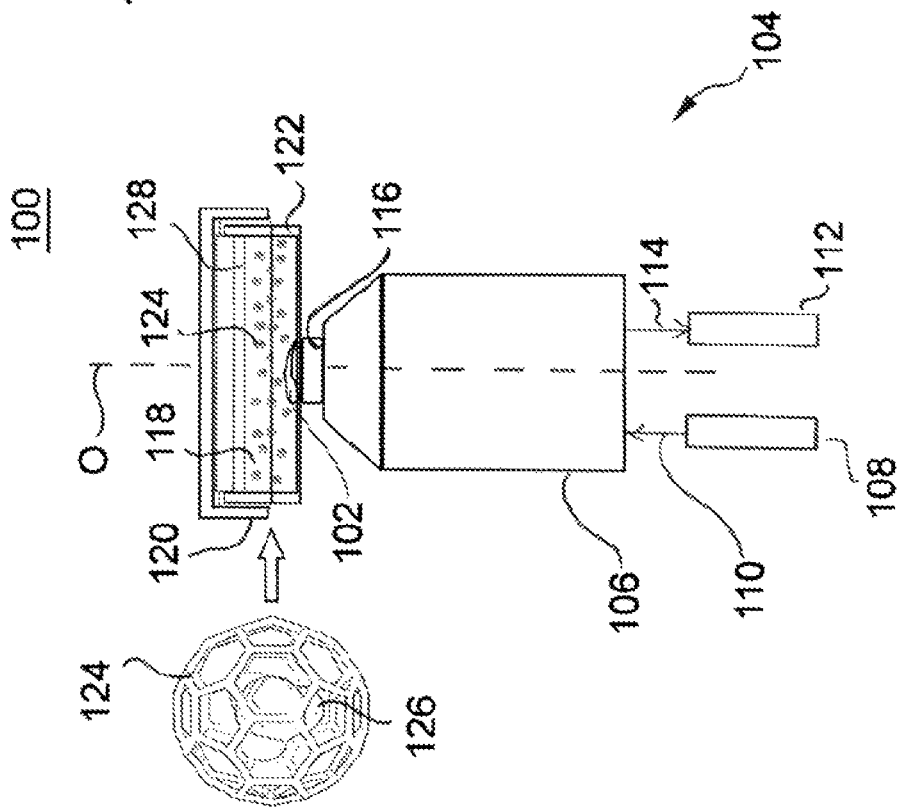
Fig. 1
Fig. 2

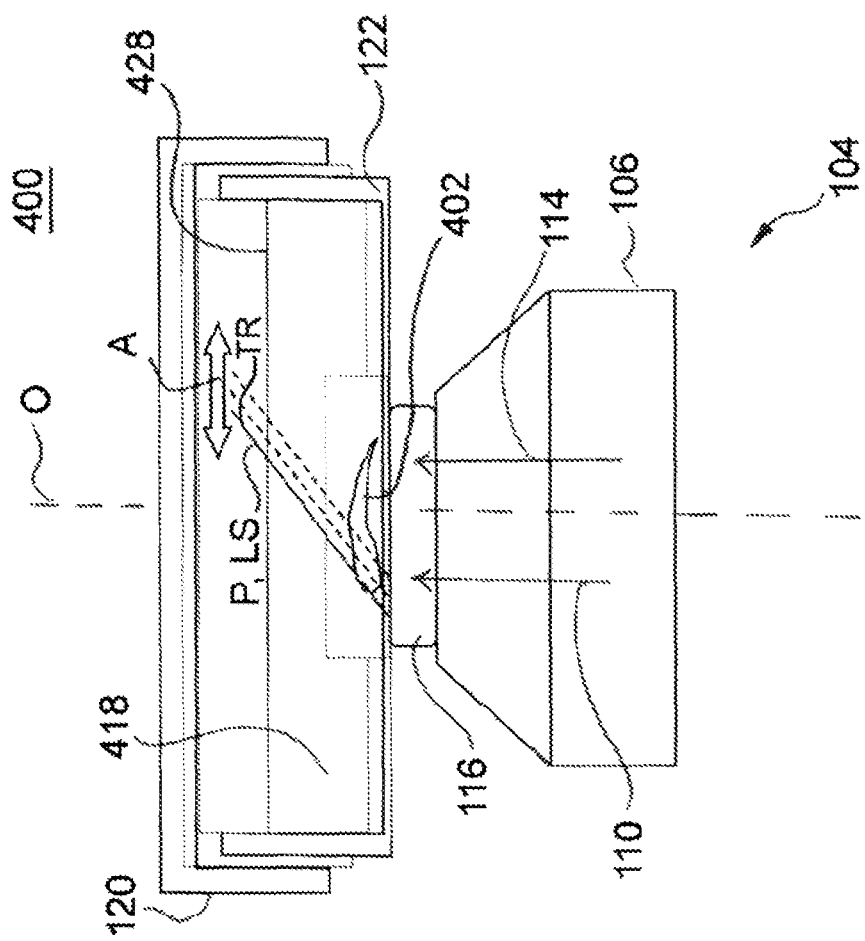
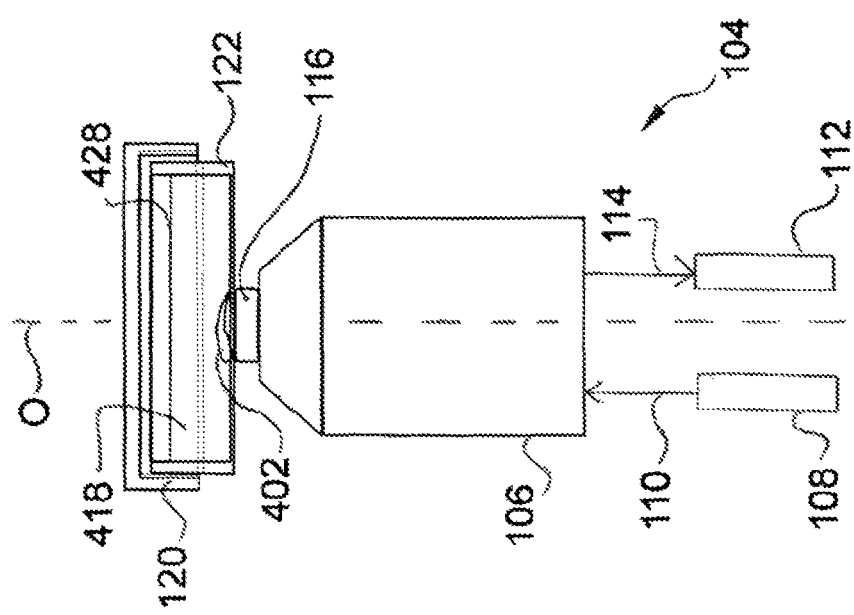
Fig. 5
Fig. 4

METHOD AND DEVICE FOR OPTICALLY EXAMINING A BIOLOGICAL SAMPLE

CROSS-REFERENCE TO PRIOR APPLICATION

Priority is claimed to European Patent Application No. EP 20182204, filed on Jun. 25, 2020, the entire disclosure of which is hereby incorporated by reference herein.

FIELD

The present invention relates to a method and a device for optically examining a biological sample.

BACKGROUND

There are biological techniques available which allow to measure the effect of test substances, e.g. new drug candidates in response to an external light application. For instance, in the field of optogenetics and optopharmacology, chemically inactive substances can be activated by light stimulation and thereby induce biological processes. These substances may include so-called caged compounds and photoswitchable ligands which enable for instance a manipulation of receptors, ion channels and other proteins with a high degree of spatial and temporal control. The biological processes induced by light application can be observed by imaging the biological sample using a microscope system.

The state of the art is to measure the effect of new drug candidates via automatic pipetting robots or by manually adding chemical stimulants and monitoring drug effects under fluorescence. When using a laser-assisted microscope system, an automatic pipetting robot must be used since manual addition of the chemical stimulants and simultaneous imaging based on a laser-assisted method is not possible for laser protection reasons. Up to now, point-by-point imaging configurations or widefield imaging configurations are utilized as microscope systems. For instance, a point-by-point imaging configuration is usually applied in optopharmacological approaches in order to implement point laser ablations which only allow the examination of a released molecule in one laser point. Such an approach is relatively unprecise when addressing neurological questions, and it cannot resolve drug effects on several neurons in a given volume. On the other hand, a widefield system does not allow complete volume imaging for tracking protein dynamics.

SUMMARY

In an embodiment, the present invention provides a method for optically examining a biological sample, comprising: preparing a light-activatable specimen including the biological sample; activating a target region of the light-activatable specimen by irradiating activation light into the light-activatable specimen, the activation light being formed by a light sheet configured to illuminate a plane in the light-activatable specimen, the plane including at least a part of the biological sample; and imaging the plane illuminated with the light sheet.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 1 is a schematic diagram illustrating an optical examination of a biological sample using a light sheet microscope according to an embodiment in which the biological sample is part of a light-activatable specimen including light-sensitive envelopes with molecules encapsulated therein;

FIG. 2 is a schematic diagram illustrating a light sheet illumination of a plane of the biological sample according to the embodiment shown in FIG. 1;

FIG. 4 is a schematic diagram illustrating an optical examination according to another embodiment in which is biological sample is genetically modified to include light-sensitive proteins;

FIG. 5 is a schematic diagram illustrating a light sheet illumination of a plane of the biological sample according to the embodiment shown in FIG. 4;

DETAILED DESCRIPTION

Figure 3:
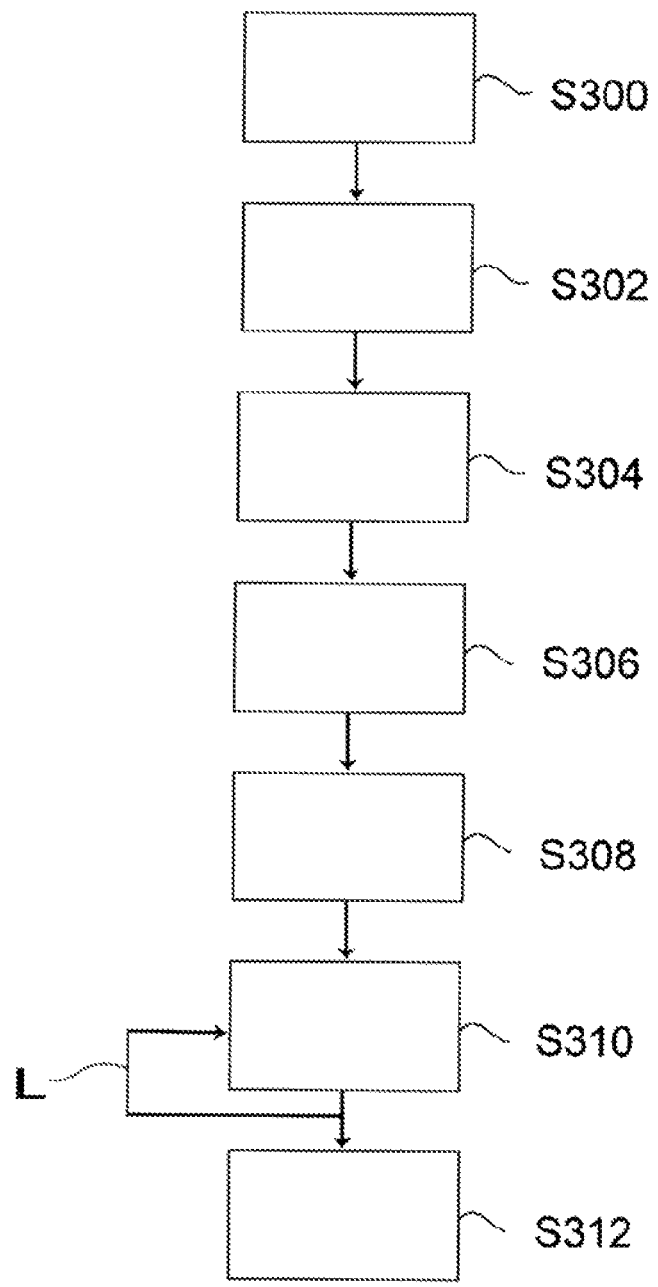
FIG. 3 is a flow diagram illustrating a method for optically examining the biological sample according to the embodiment shown in FIGS. 1 and 2.

In an embodiment, the present invention provides a method and a device which allow to optically examine a biological sample in a fast and precise manner.

According to an embodiment, a method for optically examining a biological sample comprises the following steps: preparing a light-activatable specimen including the biological sample; activating a target region of the light-activatable specimen by irradiating activation light into the light-activatable specimen, wherein the activation light is formed by a light sheet which illuminates a plane in the light activatable specimen, said plane including at least a part of the biological sample; and imaging the plane illuminated with the light sheet.

The method proposed herein utilizes light sheet illumination for both activating a target region of a light-activatable specimen including the biological sample and observing a plane in the light-activatable specimen which includes at least a part of the biological sample. As explained below in more detail, it should already be noted that the light-activated target region and the light sheet plane which is to be imaged can, but need not, coincide spatially. In particular in a case where the light-activated target region and the imaged light sheet plane are coincident, i.e. coplanar, the method can advantageously be used for simultaneously photoactivating and imaging the sample.

Accordingly, hereinafter the activation light is to be understood as light which is identical to the light sheet as such or as light which is—so to speak—indirectly formed by the light sheet, e.g. by a beam waist of the light sheet scanning through the specimen.

Further, it is assumed that the afore-mentioned light-activatable specimen is formed by an entity which includes the biological sample to be examined. For instance, the specimen may comprise a medium in which the biological sample is located when examined by means of the light sheet microscope. The ability of the specimen to be light-activated may be based on the fact that a part of the specimen surrounding the biological sample as for example the aforementioned medium is light-activatable and/or the sample itself is light-activatable. In any case, the plane of the specimen which is illuminated with the light sheet includes at least a part of the biological sample because it is this plane that is imaged by means of the light sheet microscope for optically examining the biological sample.

Using a light sheet for both photoactivating the target region of the specimen and imaging the light sheet plane enables a user to obtain optical information not only from a single point within the sample but from an extended sample area. Specifically in a case in which the light sheet is scanned through the sample as explained in further detail below it is even possible to obtain the information from an entire sample volume. Accordingly, the proposed method is superior to conventional approaches applying point-by-point imaging as for example a confocal system which only allows an optical examination in one single laser point. On the other hand, the method proposed herein is also superior to conventional wide field systems as it allows complete volume imaging for e.g. tracking protein dynamics.

As the method allows to photoactivate and to image the biological sample simultaneously, a further advantage of the method over the prior art is that the sample is easier to handle and the optical examination can be performed more quickly. This is particularly advantageous in the investigation of fast biological processes as for example neurological activities. Compared to conventional pipetting systems, a further advantage is that the biological sample which may be e.g. a spheroid or organoid does not move as a result of the pipetting due to fluid flow.

For instance, the light-activatable specimen includes a medium containing light-sensitive envelopes in which molecules are encapsulated, said light-sensitive envelopes being configured to release the molecules when irradiated with the activation light. Further, the step of activating the target region of the light-activatable specimen comprises a step of releasing the molecules from the light-sensitive envelopes by irradiating the target region with the activation light.

According to this embodiment, the ability of the specimen to be light-activated is based on the light-sensitivity of the envelopes contained in the medium which is part of the specimen. The light-sensitive envelopes may be formed by so-called uncaged molecules which release the substances encapsulated therein when being irradiated with light of a suitable wavelength. Just as an example, fullerenes as C60 may be used as envelopes.

Alternatively, the light-sensitive envelopes may be formed by micelles. Such micelles can be produced by shaking lipid layers into which photoreactive substances such as Rhodopsin or other proteins are introduced, these substances changing their structure when being irradiated with light. Thus, the micelles can be opened due to the light-induced change of structure of the photoreactive substances hen being irradiated with light. The micelles may contain certain chemical stimulants, e.g. neurotransmitters such as dopamine or GABA, test drugs, etc., which are released by light. The micelles can then be applied to living biological samples, e.g. spheroids, organoids, sectional cultures, etc. 3D imaging can be started by irradiating light of a suitable wavelength to release the substances enclosed in the envelopes. This allows to measure the kinetics of the substances before, after and during the addition in a whole sample volume by means of light sheet technology.

For instance, the molecules encapsulated in the light-sensitive envelopes are configured to emit fluorescent light when irradiated with the activation light. In this case, fast biological processes can be examined based on the fluorescent light emitted from a fluorescence labeled sample structure illuminated with the light sheet.

Further, the biological sample may be genetically modified to include light-sensitive substances which are configured to be activated when irradiated with the activation light. Further, the step of activating the target region of the light-activatable specimen may comprise a step of activating the light-sensitive proteins by irradiating the target region with the activation light. For instance, an activity of light-sensitive proteins in the biological sample can be controlled by irradiating the light sheet into the sample, and the illuminated plane can be imaged simultaneously.

The step of preparing the light-activatable specimen may comprise a step of adding a medium into a sample container which includes the biological sample.

The sample container may include a cell culture dish, and the step of adding the medium into the sample container may comprise a step of pipetting the medium into the cell culture dish in which the biological sample is already placed. Subsequently, the cell culture dish can be transferred to the light sheet microscope, and the light-activatable specimen is ready to be examined.

Preferably, the step of illuminating the target portion of the light activatable specimen is preceded by a step of observing the sample container under transmitted light. Thus, the user can orientate himself in the sample to find a region of interest (ROI) which is to be activated and imaged. Specifically, the user is enabled to determine a sample volume which is examined subsequently.

According to an embodiment, the activation light may be formed from the light sheet such that the target region of the light-activatable specimen irradiated with the activation light is coincident with the plane being imaged. In this case, photoactivation and imaging are performed in spatial coincidence and, preferably, at the same time. Accordingly, fast biological processes as e.g. neuronal activities can be triggered and observed in real-time.

Alternatively, the activation light may be formed from the light sheet such that the target region of the light-activatable specimen irradiated with the activation light is non-coincident with the plane being imaged. Here, photoactivation and imaging diverge spatially. This approach may be applied to manipulate the sample with a light intensity which is higher than an intensity of a conventional light sheet illumination.

In a preferred embodiment, the plane including the biological sample is both illuminated and imaged by means of a single objective. For instance, the light sheet microscope may be formed by an oblique plane microscope (OPM). In this case, the plane illuminated with the light sheet is oriented obliquely to an optical axis of the objective.

Preferably, the light sheet is swept through the light-activatable specimen for imaging a volume of the biological sample. In this case, the light sheet microscope is formed by a so-called SCAPE microscope (swept, confocally-aligned planar excitation) where the light sheet is scanned through the sample so that an entire sample volume can be illuminated and imaged at the same time.

Alternatively, the plane including the biological sample is illuminated by means of a first objective and is imaged by means of a second objective. In such a configuration, the two objectives may be oriented towards the sample with their optical axes being perpendicular to each other.

According to another aspect, a device for optically examining a biological sample comprising a light-activatable specimen including a medium and the biological sample located therein; and a light sheet microscope comprising an illumination system and an imaging system. The illumination system is configured to activate a target region of the light-activatable specimen by irradiating activation light into the light-activatable specimen, wherein the activation light is formed by a light sheet which illuminates a plane in the light-activatable specimen, said plane including at least a part of the biological sample. The imaging system is configured to image the plane illuminated with the light sheet.

The light sheet microscope may include a single objective which is configured to both illuminate and image the plane including the biological sample.

Alternatively, the light sheet microscope may include a first objective which is configured to illuminate the plane including the sample, and a second objective which is configured to image the illuminated plane.

The illumination system may be configured to form the activation light from the light sheet such that the target region of the light-activatable specimen irradiated with the activation light is coincident with the plane imaged by the imaging system.

According to an alternative embodiment, the illumination system is configured to form the activation light from the light sheet such that the target region of the light-activatable specimen irradiated with the activation light is non-coincident with the plane imaged by the imaging system.

Preferably, the illumination system comprises a light source configured to emit illumination light; an optical system configured to form the light sheet from the illumination light in the light-activatable specimen, said light sheet being focused in a thickness direction perpendicular to a light propagation direction thereof to form a beam waist in said thickness direction; wherein the optical system has a field diaphragm adjustable to vary a width of the light sheet in a width direction being perpendicular to both the light propagation direction and the thickness direction; a scanning element configured to move the light sheet by a scanning distance along a scanning direction in the light-activatable specimen; and a controller configured to control the field diaphragm for adjusting the width of the light sheet and to control the scanning element for moving the light sheet by the scanning distance in order to irradiate the target region of the light-activatable specimen by scanning the target region with the beam waist of the light sheet, said target region being defined by the width of the light sheet and the scanning distance.

According to this embodiment, the field diaphragm is controlled in synchronization with the scanning element to photoactivate the sample in a target region which is not coplanar with the plane to be imaged by means of the light sheet microscope. Specifically, the beam waist of the light sheet scanning through the sample is utilized to photoactivate the target region thereof. The target region may be located in spatial coincidence with a focal plane of the objective facing the sample. The dimensions of the target region can be suitably adjusted by controlling the field diaphragm and the scanning element. Specifically, the width of the target region perpendicular to the scanning direction can be adjusted by means of the scanning element, and the length of the target region along the scanning direction can be adjusted by means of the field diaphragm.

FIGS. 1 and 2 are schematic diagrams showing a device 100 for optically examining a biological sample 102 according to an embodiment. The sample 102 may be a living organism as for example a zebrafish.

The device 100 comprises a light sheet microscope 104 which is configured to illuminate the biological sample 102 with a light sheet, i.e. an approximately planar laser light distribution. The light sheet may be formed by focusing a laser light beam in only one direction, e.g. using a cylindrical lens. Alternatively, a circular laser light beam may be scanned in one direction to create the light sheet.

According to the embodiment shown in FIG. 1, the light sheet microscope 104 is operated in a SCAPE configuration using a single objective 106 for both illuminating and imaging the biological sample 102. With such a SCAPE configuration, an oblique light sheet LS is swept through the sample 102 as shown in FIG. 2 where the scanning light sheet LS is illustrated by solid and dashed designated lines, respectively. Although a SCAPE configuration may be a preferred embodiment in particular in view of sample positioning and alignment, the light sheet microscope shown in FIGS. 1 and 2 is to be understood merely an example. Any other type of light sheet microscope may be used, for instance a configuration comprising two separate objectives for illuminating and imaging the sample 102, respectively.

As schematically depicted in FIG. 1, the light sheet microscope 104 comprises an illumination system 108 supplying illumination light 110 to the objective 106 which directs the illumination light 110 in form of the light sheet LS into the sample 102. In order to tilt the light sheet LS relative to an optical axis O of the objective 106, the illumination light 110 may enter an off-axis sub-area of a pupil of the objective 106 so that the light sheet LS emerges from the objective 106 along an oblique propagation direction as illustrated in FIG. 2. Thus, the light sheet LS illuminates an oblique portion P of the sample 102 which is approximately formed by a plane. For scanning the oblique light sheet LS through the sample 102 in a direction perpendicular to the optical axis O, a scanning mirror (not shown in FIGS. 1 and 2) may be provided, said scanning mirror varying an angle of incidence of the illumination light 110 within the objective pupil. Accordingly, a variation of the angle of incidence of the illumination light 110 is converted into a lateral scanning movement of the Light sheet LS and the plane P illuminated thereby as illustrated by an arrow A in FIG. 2.

The light sheet microscope 104 further comprises an imaging system 112 receiving detection light 114, e.g. fluorescent light from the illuminated sample 102 though the objective 106 in order to generate an image of the illuminated plane P of the sample 102. According to the specific SCAPE configuration shown in FIGS. 1 and 2, the detection light 114 is collected by the objective 106 in an off-axis sub-area of the objective pupil which is located opposite to the pupil area receiving the illumination light 110 with respect to the optical axis O. Thus, the afore-mentioned off-axis pupil areas for illumination and detection, respectively, are located on opposite side of the optical axis O.

According to the SCAPE configuration shown in FIGS. 1 and 2, the plane P imaged by the imaging system 112 is tilted relative to the optical axis O of the objective 106. Accordingly, the plane P is not coincident with a focal plane of the objective 106. Therefore, the light sheet microscope 104 may comprise an image erecting system configured to image the tilted plane P onto an image sensor plane of an image sensor (not shown in FIGS. 1 and 2) which is correspondingly tilted with respect to the optical axis O.

According to the embodiment illustrated in FIGS. 1 and 2, the biological sample 102 is optically examined by means of the light sheet microscope 102 while being located in a growth medium 118. For receiving the growth medium 118, a sample container 120 including a cell culture dish 122 may be provided. For instance, the growth medium 118 is pipetted into the cell culture dish 122 in which the biological sample 102 is already placed. Further, an immersion medium 116 may be provided between the sample container 120 and the objective 106.

According to the present embodiment, a growth medium 118 contains a plurality of light-sensitive envelopes 124 with molecules 126 encapsulated therein as illustrated in FIG. 1. Each light-sensitive envelope 124 is configured to release the molecule 126 encapsulated therein in case that the envelope 124 is irradiated with the light sheet LS. For this purpose, the light sheet LS is generated in such a way that is has suitable wavelength and intensity allowing the encapsulated molecules 126 to be released when the envelopes 124 are irradiated in the plane P.

The growth medium 118 containing the light-sensitive envelopes 124 and the biological sample 102 located therein together form a light-activatable specimen 128. The characteristic of the specimen 128 to be light-activatable is caused by the light sensitivity of the envelopes 124 enabling the encapsulated molecules 126 to be uncaged by irradiating the light sheet LS. In other words, the photoactivation of the specimen 128 comes down to the photoactivation of the envelopes 126 for releasing the molecules 124 therefrom.

Hereinafter, a method for optically examining the biological sample 102 using the configuration shown in FIGS. 1 and 2 is explained referring to the flow diagram of FIG. 3.

In step S300, the light-sensitive envelopes 124 with the encapsulated molecules 126 are added to the growth medium 118. In step S302, the growth medium 118 containing the light-sensitive envelopes 124 is pipetted into the cell culture dish 122 of the sample container 120. Before pipetting the growth medium 118 into the cell culture dish 122, the biological sample 102 may already have been placed in the cell culture dish 122. Thus, steps S300 and 5302 serve to prepare the light-activatable specimen 128 which includes the growth medium 118 with the light-sensitive envelopes 124 and the biological sample 102.

In step S304, the sample container 120 including the light-activatable specimen 128 is transferred to the light sheet microscope 104 in order to implement a setup as shown in FIGS. 1 and 2. In step S306, before starting the actual examination process, the sample container 120 may be observed under transmitted light to search a region of interest (ROI) of the biological sample 102 and to mark the same. In step S308, a sample volume to be examined is defined.

Subsequently, in step S310, photoactivation of the light-activatable specimen 128 is started. For this, activation light is irradiated into the light-activatable specimen 128 which includes the growth medium 118 containing the light sensitive envelopes 124 with the encapsulated molecules 126 and the biological specimen 102 located in the growth medium 118. The activation light is formed by the light sheet LS which illuminates the plane P in the light-activatable specimen 128. As shown in FIG. 2, the illuminated plane P is located to include at least a part of the biological sample 102. At the same time, an optical image of the illuminated plane P is generated by means of the imaging system 112 which records the detection light 114 emerging from the illuminated plane P. In the example shown in FIGS. 1 and 2, it may be assumed that the molecules 126 encapsulated in the light-sensitive envelopes 124 emit fluorescent light when being irradiated with the light sheet LS. Thus, in step S310, the process of photoactivating the plane P, i.e. uncaging the molecules 126 encapsulated in the light-sensitive envelopes 124 located in the plane P, and the process of imaging the illuminated plane P are executed simultaneously.

Step S310 for simultaneously activating and imaging is repeated in a loop L while sweeping the oblique light sheet LS through the sample volume defined in step S308 so that the whole volume is photoactivated and imaged as illustrated in FIG. 2. As a result, an optical examination of the sample volume can be performed.

Finally, in step S312, the image acquisition is completed, and the sample container 120 is removed from the light sheet microscope 104 and may be used for other purposes.

The method shown in FIG. 3 may be applied by a user to study fast biological processes within the sample 102 without damaging the sample 102 and without missing interesting processes spatially and temporarily. Just as an example, it may be assumed that the molecules 126 encapsulated in the light-sensitive envelopes 124 consist of neurotransmitters which are released from the envelopes 126 to induce neuronal processes in the sample 102 when the specimen 128 is irradiated with the light sheet LS. In such a case, the neuronal activities caused by the neurotransmitters 102 can be studied in real-time. Needless to say that molecules 126 of other types such as for example test drugs may be utilized to study a variety of biological processes in the sample 102.

In the example explained above with reference to FIGS. 1 to 3, the activation light for releasing the encapsulated molecules 126 from the light-sensitive envelopes 124 is formed from the light sheet LS such that a photoactivated target region TR of the light-activatable specimen 128 irradiated with the activation light is coincident with the plane P being imaged by the light sheet microscope 104. Thus, the oblique light sheet LS as such is used for both photoactivation, i.e. releasing the molecules 126 from the light sensitive envelopes 124, and imaging the illuminated plane P which is coincident with the photoactivated target region. In short, the target region TR to be photoactivated is coplanar with the plane B to imagined, i.e. the target region TR and the plane P do not diverge.

FIGS. 4 and 5 are schematic diagrams showing a device 400 for optically examining a biological sample 402 according to another embodiment. The device 400 differs from the configuration shown in FIGS. 1 and 2 only in terms of the light-activatable specimen including the biological sample to be examined. Thus, in the embodiment shown in FIGS. 1 and 2, the ability of the specimen 128 to be activated by light is based on the light sensitivity of the envelopes 124 which are included in the growth medium 118. In contrast, according to the embodiment shown in FIGS. 4 and 5, the ability of a specimen 428 to be photoactivated is based on the biological sample 402 itself. For this purpose, the biological sample 402 may, for example, be genetically modified to contain light-sensitive proteins which are configured to be activated when irradiated with the light sheet LS. Thus, biological processes induced by the light-sensitive proteins can be observed in real-time.

Accordingly, the device 400 comprises the light-activatable specimen 428 which includes a growth medium 418 (without the light-sensitive envelopes 126 as shown FIGS. 1 and 2) and the biological sample 402 genetically modified as mentioned above. The method for optically examining the genetically modified sample 402 largely corresponds to the method described above with reference to FIG. 3. However, it is evident that a workflow applied to the configuration shown in FIGS. 4 and 5 does not require step S300 shown in FIG. 3 in which the light-sensitive envelopes 124 are added to the growth medium 118. Instead of S300, a step may be provided in which the biological sample 402 is genetically modified to include light-sensitive proteins for rendering the sample 402 light-activatable.

Similar to the example of FIGS. 1 and 2, the configuration illustrated in FIGS. 4 and 5 uses the oblique light sheet LS as such for both photoactivation, i.e. activating the light-sensitive proteins within the genetically modified specimen 402 and imaging the illuminated plane P which is coincident with the photoactivated target region TR. Accordingly, the target region TR to be photoactivated is coplanar with the plane P to imagined, i.e. the target region TR and the plane P do not diverge.

Using the light sheet LS for simultaneously photoactivating the target region TR of the sample and imaging the oblique plane P in a coplanar manner as explained above with reference to the embodiments shown in FIGS. 1 to 5 is a straightforward procedure to examine biological processes in a living organism. However, the technical solution proposed herein may also be applied to photoactivate a target region by means of light sheet irradiation within the specimen in a manner in which the photoactivated target region is non-coincident, i.e. not coplanar with the imaged light sheet plane P. An embodiment illustrating this approach is shown in FIGS. 6 and 7.

Figure 6:
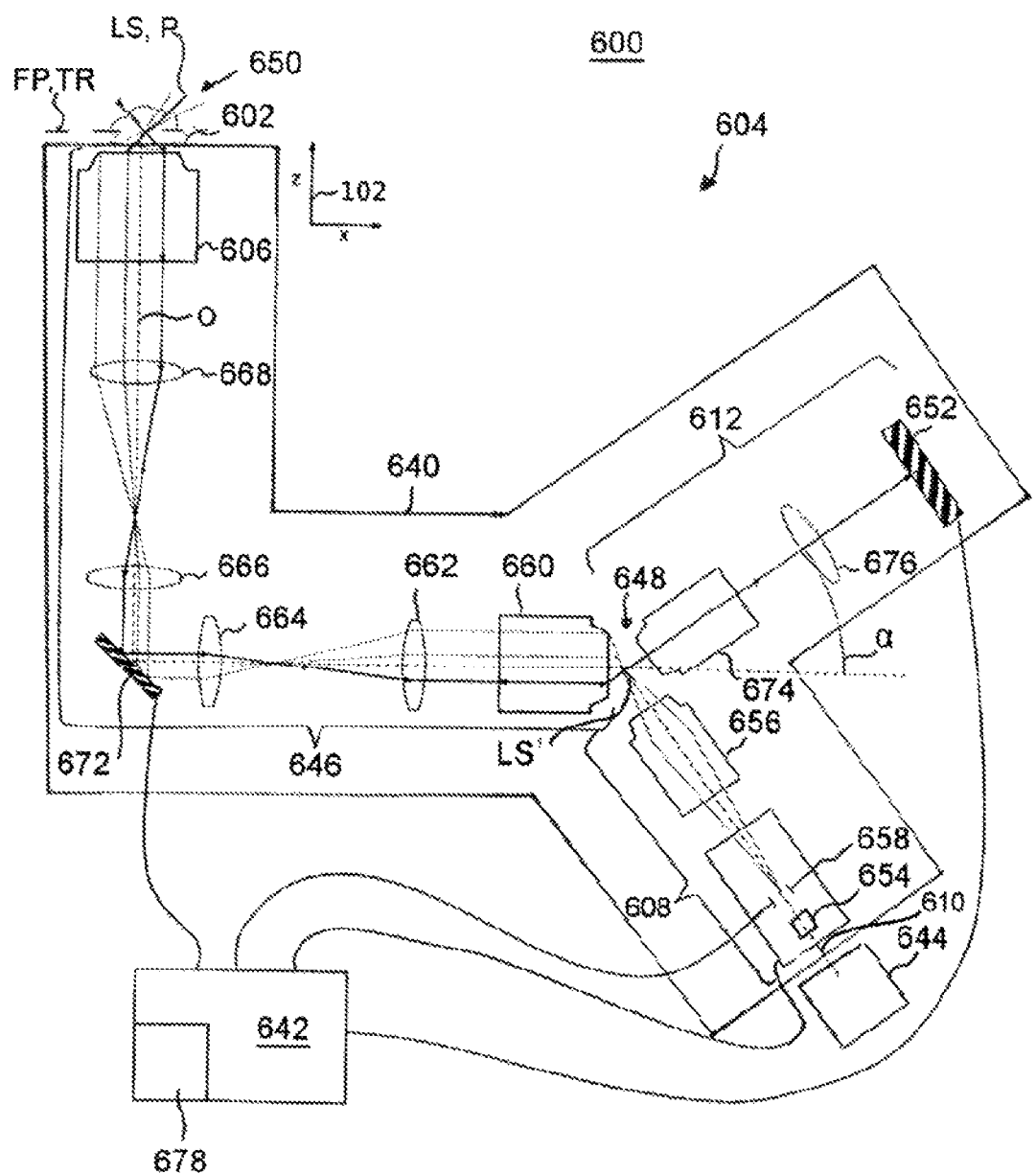
FIG. 6 is a diagram showing a light sheet microscope according to another embodiment in which the biological sample is activated in a target region that is non-coincident with the plane being imaged by the light sheet microscope.
Figure 7:
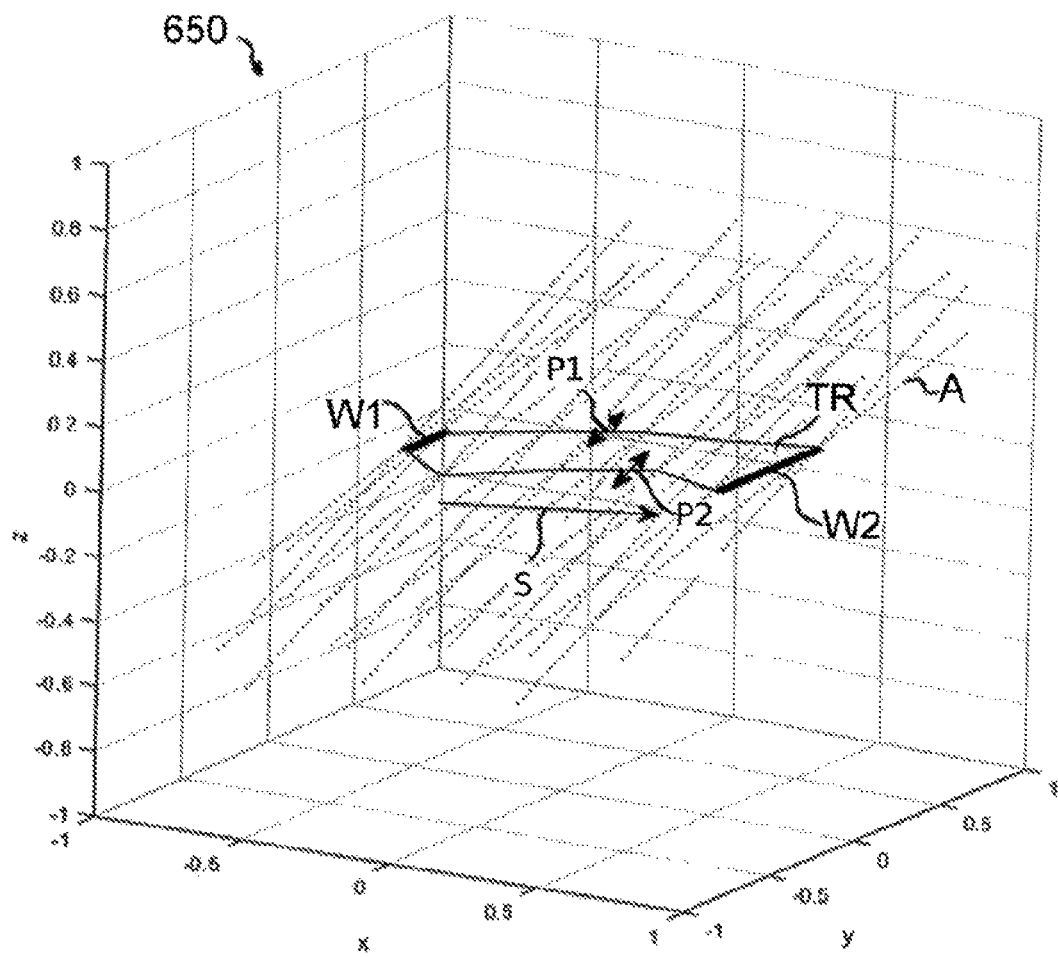
FIG. 7 is a schematic diagram illustrating a light activation of a target area by means of a light sheet illumination wherein the target area is not coplanar with the light sheet plane.

FIG. 6 shows a schematic diagram of a device 600 comprising a light sheet microscope 604 according to an embodiment. Similar to the embodiments shown in FIGS. 1 to 5, the light sheet microscope 604 of FIG. 6 is operated in a SCAPE configuration for optically examining a biological sample 602. With regard to the sample 602, there are no fundamental differences compared to the examples shown in FIGS. 1 to 5. In particular, similar to the samples 102 and 402, the biological sample 602 may be part of a light activatable specimen which comprises a growth medium containing the sample as explained above. For simplicity, only the sample 602 is shown in FIG. 6.

The light sheet microscope 604 comprises an optical system 640 and a controller 642 configured to control the optical system 640. The optical system 640 includes an optical illumination system 608, an optical imaging system 612, and an optical transport system 646. The illumination system 608 and the transport system 646 are configured to interact with each other to illuminating the plane P in the sample 602 with the light sheet LS, said plane P being oblique relative to an optical axis O of the optical system 640. Likewise, the imaging system 612 and the transport system 646 are configured to interact with each other to create an optical image of the illuminated plane P.

The illumination system 608 comprises a light source 644 which emits illumination 610. In the present embodiment, the light source 644 may be a pulsed laser unit. However, the light source 106 may also be formed by a continuous laser unit or an assembly of two or more laser units and a beam combining element configured to combine the laser light beams emitted by the two or more laser units into a single beam. The light source 644 may also be a source of incoherent light.

The illumination system 608 forms the illumination light 610 emitted by the light source 644 into a light sheet LS' which located in an intermediate image space 648. The optical transport system 646 is configured to form an image of the light sheet LS' in a sample space 650 in which the sample 602 is located. This light sheet image forms the light sheet LS which is utilized to illuminate the plane P of the sample 602. In other words, the transport system 646 is used to—so to speak—transport the light sheet from the intermediate image space 648 into the sample space 650.

Further, the transport system 646 forms an intermediate image of the illuminated plane P in the intermediate image space 648. Thus, the transport system 646 is used to—so to speak—transport the illuminated plane P from the sample space 650 to the intermediate space 648. Subsequently, the imaging system 612 images the intermediate image of the plane P from the intermediate image space 648 onto an image sensor 652.

More specifically, the optical illumination system 608 comprises a light sheet forming element 654, e.g. a cylindrical lens or a scanning element, and an illumination objective 656 facing the intermediate image space 648. The light sheet forming element 654 and the illumination objective 656 interact with each other to form the light sheet LS' and direct the same into the intermediate image space 648. In particular, the light sheet LS' is focused in a thickness direction perpendicular to a light propagation direction thereof and forms a beam waist in said thickness direction.

The optical illumination system 608 further comprises an adjustable field diaphragm 658 which is configured to be adjustable in order vary a dimension of the light sheet in a width direction, said width direction being perpendicular to both the light propagation direction and the thickness direction.

According to the present embodiment, the optical transport system 646 is telecentric. More specifically, the optical transport system 646 comprises an image side objective 660 facing the intermediate image space 648, a first tube lens 662, a first ocular lens 664, a second ocular lens 666, a second tube lens 668, and an objective 606 facing the sample 602 in this order from the intermediate image space 648. The optical transport system 646 further comprises a scanning element 672, e.g. a tiltable mirror, which is arranged between the first and second ocular lenses 664, 666. The scanning element 672 is configured to move the light sheet LS through the sample space 650 along a scanning direction which is perpendicular to the optical axis O of the objective 606. Referring to the coordinate system indicated in FIG. 6, the scanning direction is parallel to the x axis.

Scanning the light sheet LS through the sample 602 does not have to performed by the scanning element 672. Just as an example, instead of the scanning element 672, a piezo-driven objective actuator may be used to move the objective 606 relative to the sample 602.

The imaging system 612 comprises a detection objective 674, a tube lens 676, and the image sensor 652. The image of the illuminated plane P generated by the transport system 646 in the intermediate image space 648 is imaged through the detection objective 674 and the tube lens 676 onto the image sensor 652.

Accordingly, the optical system 640 of the light sheet microscope 604 is configured as an image erecting system which serves to image the tilted plane P onto the image sensor 652 which is tilted correspondingly by an angle α with respect to the optical axis O. Thus, a correctly oriented image of the plane P can be captured although the plane P is tilted, i.e. not coincident with a focal plane FP of the objective 606.

The controller 642 may comprises an input device 678 for inputting a desired geometry of the target region of the sample 602 (or the light-activatable specimen including the sample 602) to be photoactivated to induce biological processes which are to be observed by means of the light sheet microscope 604. In the present embodiment, it is assumed that the target region TR is coincident with the focal plane FP of the objective 606.

The controller 642 is connected to the light source 644, the field diaphragm 658, the scanning element 672, and the image sensor 652. The controller 642 is configured to photoactivate the target region TR of the sample 602 by controlling the scanning element 672 and the field diaphragm 658 in a synchronized manner. In particular, the scanning element 672 may be controlled to move the light sheet LS along the scanning direction by a scanning distance which is determined by the desired geometry of the target region TR. In addition, the field diaphragm 658 may be controlled to adjust the width of the light sheet LS. Specifically, the field diaphragm 658 may be adjusted once before the light sheet LS is moved along the scanning direction or continuously while the light sheet LS is moved in order to determine the desired geometry of the target region TR.

FIG. 7 illustrates in more detail how the desired geometry of the target region TR is determined by simultaneously controlling the field diaphragm 658 and the scanning element 672.

FIG. 7 shows the sample space 650 of the light sheet microscope 604 with reference to an orthogonal x-y-z coordinate grid corresponding to the coordinate system of FIG. 6. Accordingly, axis x is parallel to a scanning direction S, axis y is perpendicular to both the scanning direction S and the optical axis O of the objective 606 facing the sample space 650, and axis z is parallel the optical axis O.

As shown in FIG. 7, the sample 602 is photoactivated in the target region TR by moving a beam waist of the light sheet LS along the scanning direction S. The beam waist is defined by a portion of the light sheet LS where a thickness thereof is minimal and an intensity density thereof is maximal. A light distribution forming the scanning the light sheet LS is approximately illustrated in FIG. 7 by dotted lines A crossing each other at the position of the beam waist.

The beam waist at the start of the scanning motion is indicated in FIG. 7 as a first thick line W1, and the beam waist at the end of the scanning motion is indicated in FIG. 7 as a second thick line W2. The width of the light sheet LS is varied during the scanning motion by controlling the field diaphragm 658 correspondingly according to the desired geometry as illustrated in FIG. 7 by two double-headed arrows P1, P2. In particular, the field diaphragm 658 may be configured to adjust the positions of opposite ends of the width of the light sheet LS independently from each other. This allows the outline of the target region TR to be a polygon as shown in FIG. 7 rather than a rectangle or parallelogram. The scanning distance by which the oblique light LS is scanned along the scanning direction S, i.e. the distance between the lines W1 and W2 along the x axis in FIG. 7, determines a length of the target region TR along the scanning direction S. As a result, the dimensions of the target region TR can be suitably adjusted by controlling the field diaphragm 658 and the scanning element 672.

Accordingly, controlling the field diaphragm 658 in synchronization with the scanning element 672 allows to photoactivate the sample 602 in the target region TR which is not coplanar with the plane P to be imaged with the light sheet microscope 604. For this purpose, the beam waist of the light sheet LS scanning through the sample 602 is utilized to photoactivate the target region TR thereof.

An exemplary application of this approach may provide a first step in which the target region TR is photoactivated according to a desired geometry as described above. For this purpose, a suitable wavelength and/or a suitable intensity of the illumination light 610 may be selected in order to achieve the desired photoactivation effects in the target region TR taking into account the characteristic of the light-activatable sample 602 (or the specimen including the sample 602). Subsequently, after the photoactivation is completed, a second step may be provided to form an optical image of the plane P illuminated with the light sheet LS wherein the field diaphragm 658 is usually not controlled to vary the width of the scanning light sheet LS. For instance, the field diaphragm 658 may be fully opened or automatically removed from the optical path. In this second step, the wavelength and/or the intensity of the illumination light 610 may be changed compared to the first step. In particular, the intensity may be significantly reduced in order to prevent any light-induced damage of the sample 602.

As used herein the term "and/or" includes any and all combinations of one or more of the associated listed items and may be abbreviated as "/".

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 100 device
102 biological sample
104 light sheet microscope
106 objective
108 illumination system
110 illumination light
112 imaging system
114 detection light
116 immersion medium 118 growth medium
120 sample container
122 cell culture dish
124 light-sensitive envelopes
126 molecule
128 specimen
400 device
402 biological sample
418 growth medium
428 specimen
600 device
602 biological sample
604 light sheet microscope
606 objective
608 illumination system
610 illumination light
612 imaging system
640 optical system
642 controller
644 light source
646 transport system
648 image space
650 sample space
652 image sensor
654 light sheet forming element
656 illumination objective
658 field diaphragm
660 objective
662 tube lens
664 ocular lens
666 ocular lens
668 tube lens
672 scanning element
674 detection objective
676 tube lens
678 input device
FP focal plane
O optical axis
P plane
LS, LS' light sheet
TR target region

What is claimed is:

1. A method for optically examining a biological sample, the method comprising:
preparing a light-activatable specimen including the biological sample, wherein the light-activatable specimen includes a medium containing light-sensitive envelopes in which molecules are encapsulated, the light-sensitive envelopes being configured to release the molecules when irradiated with activation light;
activating a target region of the light-activatable specimen by irradiating the activation light into the light-activatable specimen to release the molecules from the light-sensitive envelopes, the activation light being formed by a light sheet configured to illuminate a plane in the light-activatable specimen, the plane including at least a part of the biological sample; and
imaging the plane illuminated with the activation light of the light sheet that also activates the target region to release the molecules.

2. The method of claim 1, wherein the molecules encapsulated in the light-sensitive envelopes are configured to emit fluorescent light when illuminated with the activation light.

3. The method of claim 1, wherein the biological sample is genetically modified to include light-sensitive substances which are configured to be activated when irradiated with the activation light, and
wherein the light-sensitive substances are activated by the irridating of the target region with the activation light.

4. The method of claim 1, wherein the preparing of the light-activatable specimen comprises adding a medium into a sample container which includes the biological sample.

5. The method of claim 4, wherein the irridating of the target region of the light-activatable specimen is preceded by observing the sample container under transmitted light.

6. The method of claim 1, wherein the activation light is formed from the light sheet such that the target region of the light-activatable specimen irradiated with the activation light is coincident with the plane being imaged.

7. The method of claim 1 wherein the activation light is formed from the light sheet such that the target region of the light-activatable specimen irradiated with the activation light is non-coincident with the plane being imaged.

8. The method of claim 1, wherein the plane including the biological sample is both illuminated and imaged by a single objective.

9. The method of claim 8, wherein the plane illuminated with the light sheet is oriented obliquely to an optical axis of the single objective.

10. The method of claim 1, wherein the light sheet is swept through the light-activatable specimen for imaging a volume of the biological sample.

11. The method of claim 1, wherein the light-sensitive envelopes comprise fullerenes and/or micelles.

12. A method for optically examining a biological sample, the method comprising:
preparing a light-activatable specimen including the biological sample, wherein the light-activatable specimen includes a medium containing light-sensitive envelopes in which molecules are encapsulated, the light-sensitive envelopes being configured to release the molecules when irradiated with activation light;
activating a target region of the light-activatable specimen by irradiating the activation light into the light-activatable specimen to release the molecules from the light-sensitive envelopes, the activation light being formed by a light sheet configured to illuminate a plane in the light-activatable specimen, the plane including at least a part of the biological sample; and
imaging the plane illuminated with the activation light of the light sheet that also activates the target region to release the molecules,
wherein the activation of the target region and the imaging of the biological sample are performed simultaneously.

13. The method of claim 12, wherein the light-sensitive envelopes comprise fullerenes and/or micelles.

* * * * *